US008128532B2

(12) United States Patent
Chen et al.

(10) Patent No.: US 8,128,532 B2
(45) Date of Patent: Mar. 6, 2012

(54) WORKOUT PROCESSING SYSTEM

(75) Inventors: Yen-Fu Chen, Austin, TX (US); Nancy T. Sun, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 3121 days.

(21) Appl. No.: 10/617,525

(22) Filed: Jul. 10, 2003

(65) Prior Publication Data

US 2005/0010426 A1  Jan. 13, 2005

(51) Int. Cl.
*A63B 71/00* (2006.01)
(52) U.S. Cl. .................................... 482/8; 482/1; 482/9
(58) Field of Classification Search .................. 482/1–9, 482/900–902
See application file for complete search history.

(56) References Cited

U.S. PATENT DOCUMENTS

| | | | | |
|---|---|---|---|---|
| 5,788,655 | A | 8/1998 | Yoshimura | 600/587 |
| 5,960,085 | A | 9/1999 | Huerga | 380/25 |
| 6,077,193 | A | 6/2000 | Buhler et al. | 482/8 |
| 6,327,594 | B1 | 12/2001 | Huben et al. | 707/200 |
| 6,513,532 | B2 | 2/2003 | Mault et al. | 128/921 |
| 6,530,081 | B1 | 3/2003 | Hayes | 717/176 |
| 6,607,483 | B1 * | 8/2003 | Holland | 600/300 |
| 6,949,052 | B2 * | 9/2005 | Millington et al. | 482/8 |
| 7,056,265 | B1 * | 6/2006 | Shea | 482/8 |
| 7,063,643 | B2 * | 6/2006 | Arai | 482/8 |

OTHER PUBLICATIONS

ABC News "Let the Badge Do the Talking" by David Stevenson.

* cited by examiner

*Primary Examiner* — Glenn Richman
(74) *Attorney, Agent, or Firm* — David A. Mims, Jr.; Mark Vallone; Robert V. Wilder

(57) ABSTRACT

There is provided a physical fitness workout processing methodology and system for enabling remote scheduling and set-up of workout sessions for individual gym members or groups. In an exemplary embodiment, an individual or member is enabled to schedule a workout session in advance by using a wireless device or a personal computer from a location remote from the gymnasium where the workout session is to occur. The individual or user is enabled to schedule the use of various kinds of workout stations and equipment to insure that the proper equipment is available for use by the individual at the time during a workout session when it is needed. When the member enters the gym, his or her presence is detected and the member is tracked throughout the workout session. Messages are displayed on display devices by workout stations to announce that the equipment has been reserved for the member at the appropriate time. In one implementation, the member carries a membership card which transmits signals used to determine the member identification and location within the gym. When the member enters a workout station area, the member's individual settings for the exercise equipment at the workout station are automatically set and the workout data are automatically measured and entered into the member's physical fitness database which is maintained in storage at the gym server.

17 Claims, 10 Drawing Sheets

SCHEDULE REQUEST

601

MEMBER I.D. 00222

WORKOUT DATE: _____06/08/2003_____

603
SUBMIT REQUEST
CANCEL

*FIG. 6*

GYM#1 SCHEDULE FOR 06/08/2003

TREADMILL #1   TREADMILL #2 ......   CYCLE #1 ......   WEIGHTS #1 ..............

6AM
6:30
7:00
7:30
700
8:00
           705
    701         703

10PM

POINT AND CLICK ON TIME SLOT TO SELECT OR RELEASE

CANCEL
RETURN TO SELECT ANOTHER DATE
ENTER SELECTED RESERVATION INFORMATION  707

*FIG. 7*

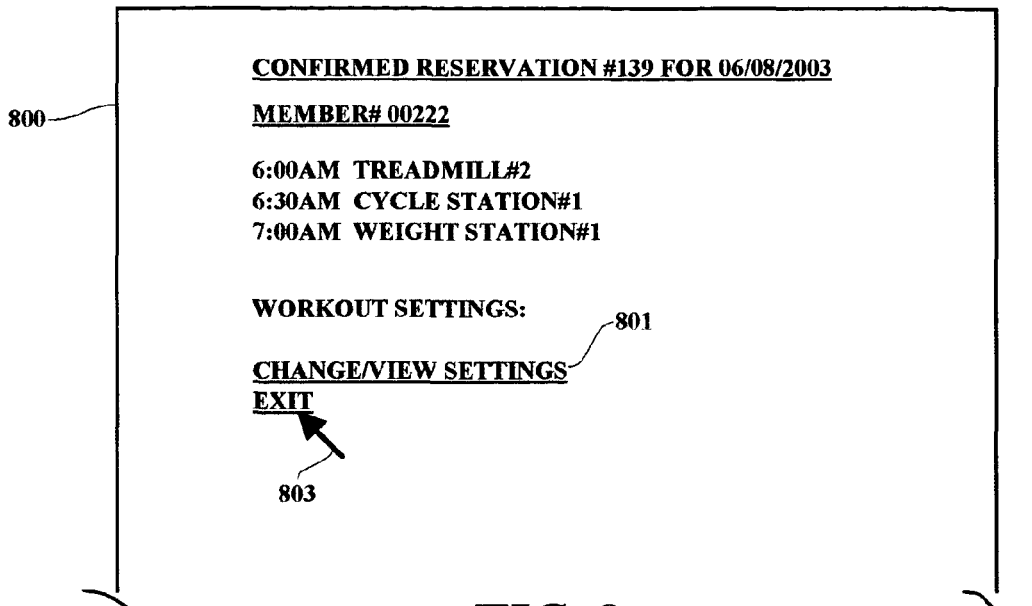

FIG. 8

RESERVATION SYSTEM DATA reservation_id            900
member_id
reserve_time
checkin_timestamp
checkout_timestamp
workout_name (which routine)
exercise_name (machine names)
exercise_reps
exercise_weight
alert_time (#minutes before reservation to alert
        others currently using machine)
⋮
▼

FIG. 9

TRACKING SYSTEM DATA tracking_id           1000
member_id
workout_id
workout_frequency
trainer_id (if trainor used)
station_number (total number stations in
               workout schedule)
station_name
station_workout_checkin_timestamp
station_workout_checkout_timestamp
station_reps
station_weight
cycle_setting
treadmill_program
⋮
▼

FIG. 10

WORKOUT PROCESSING SYSTEM

FIELD OF THE INVENTION

The present invention relates generally to information processing systems and more particularly to a methodology and implementation for enabling improved processing functionality within physical workout systems.

BACKGROUND OF THE INVENTION

Today more than ever before individuals are becoming more aware of their own physical fitness and the need to exercise. New gymnasiums or "gyms" are being opened every day to provide a place where individuals can go to workout on various kinds of equipment and physical fitness devices. These gyms are especially helpful and convenient for individuals who must sit at a desk and work during the day and get very little if any physical exercise.

Even though the number of gyms has increased and made exercise more available for physical workouts, systemic problems still make physical workouts difficult to schedule and carry-out. For example, each gym has a variety of workout devices such as treadmills, cycles or cycling equipment and weight lifting devices. Each of these units may be considered as a different workout station. One problem has been the scheduling of the various workout stations so that all those who need a workout can be certain that the proper kinds of workout equipment are available at workout time. Many times an individual cannot achieve a regular workout and measure the individual's accomplishments because when the individual is ready to exercise with a certain type of equipment, that equipment is being used by another member of the gym.

Further, people who go to the gym usually need to know what their routine has included. For example, in the past, a trainer or someone has had to keep track of the weights and numbers of repetitions or "reps" of each of several types of weight lifting exercises. Similarly, statistics must be maintained for other types of exercise equipment. For treadmills and cycles, the equivalent distance traveled should be measured and recorded as well as the speed and time. For gradually increasing exercise programs, there are different segments each with a given speed and time or distance. After achieving each segment, the speed and distance or time should be adjusted to the next higher level and the results should be recorded at each step. In the past, these statistics have either not been kept or have been kept manually by a trainer or an individual member.

For more comprehensive workout programs, a workout on a relatively lower stress equipment should be followed immediately by a workout on another type of equipment in order to obtain maximum benefit from a workout. However, it is infrequent when the next level of workout equipment is available to an individual when that individual has finished at a lower level workout station. Instead, in many cases the individual has to wait for another individual to finish at the next workout station before continuing a workout program. Frequently, if the next station is being used by someone else, a person will cut short a workout session and/or skip one or more stations thereby precluding the achievement of a maximum benefit workout.

Thus, there is a need for an improved methodology and system for enabling improved management and processing in scheduling and implementing physical fitness workout sessions.

SUMMARY OF THE INVENTION

In accordance with the present invention, there is provided a physical fitness workout processing methodology and system for enabling set-up of workout sessions and saving workout related data for individual gym members or groups. In an exemplary embodiment, the member is tracked throughout the workout session by input to the workout stations used by the member. Workout stations may be reserved and messages are displayed on display devices by workout stations to announce that the equipment has been reserved for the member at the appropriate time so that no other members will be able to use the reserved equipment. In one implementation, the member carries a membership card which transmits signals used to determine the member identification and location within the gym. When the member enters a workout station area, the member's individual settings for the exercise equipment at the workout station are automatically set and displayed at a workout station display unit, and the workout data are automatically measured and entered into the member's physical fitness database which is maintained in storage at the gym server. In another example, the scheduled workout equipment settings are preset and/or programmed when a workout session is reserved. When a member is not detected as present at a predetermined time prior to the beginning of a scheduled reserved workout session, the scheduled workstations and equipment are released for reservation by other members.

BRIEF DESCRIPTION OF THE DRAWINGS

A better understanding of the present invention can be obtained when the following detailed description of a preferred embodiment is considered in conjunction with the following drawings, in which:

FIG. 6 is an illustration of an exemplary display which may be used by a user to request a workout reservation;

FIG. 7 is an illustration of an exemplary gym schedule used in explaining an operation of an the present invention;

FIG. 8 is an illustration of an exemplary display which may be used to confirm a reservation and equipment settings;

FIG. 9 is an illustration of reservation system data which may be maintained in association with the present invention;

FIG. 10 is an illustration of tracking system data which may be maintained in association with the present invention;

DETAILED DESCRIPTION

Figure 1:
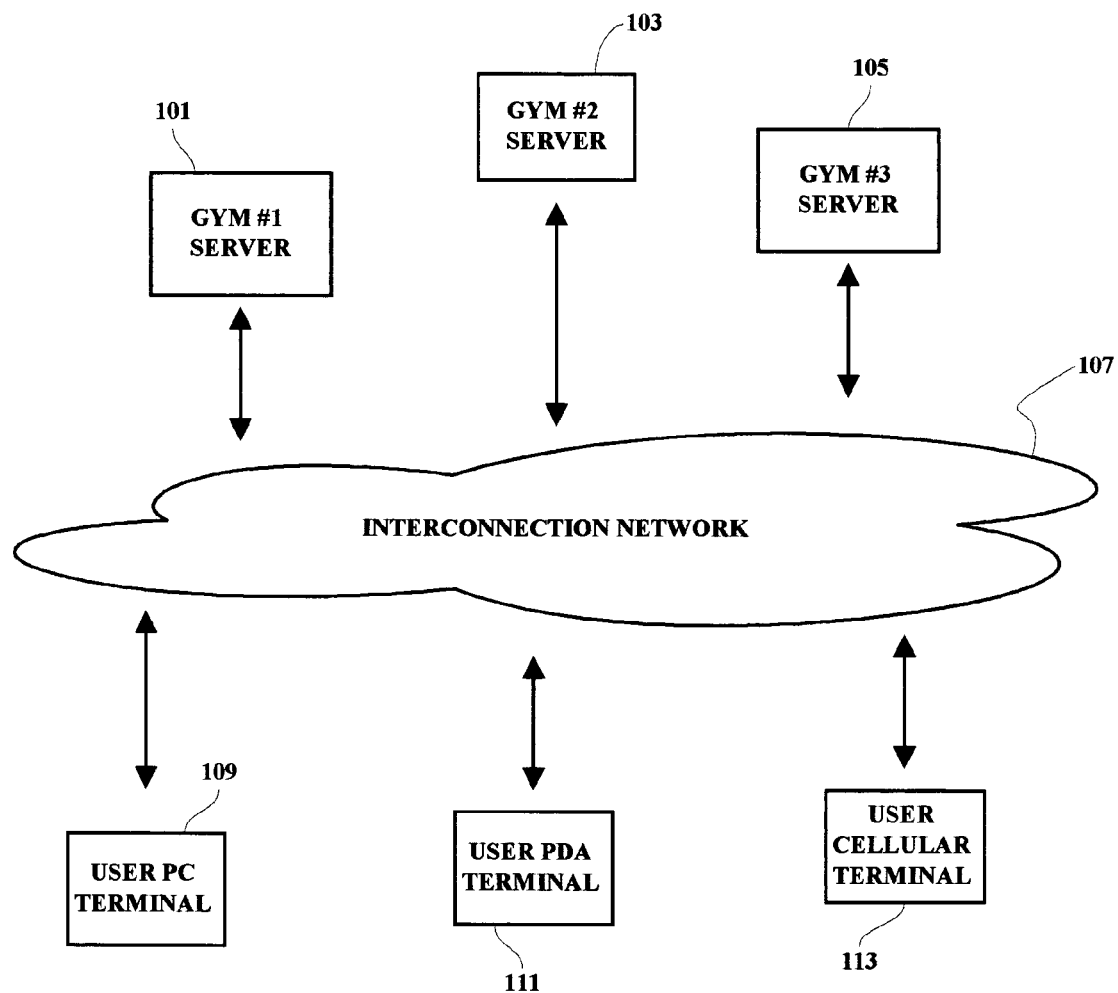
FIG. 1 is a schematic diagram illustrating a system which may be used in an exemplary implementation of the present invention.

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

The various methods discussed herein may be implemented within any communication device capable of receiving and transmitting signals utilized in computer-based applications over any inter-connection network, including but not limited to the Internet and the World Wide Web. In the present disclosure such devices include, but are not limited to, cellular and other wireless devices, personal digital assistant devices, laptop and personal computers and also desk top computers and servers connected in local area or wide area networks. The present discussion will be directed to a server-based gym application although it is understood that the principles involved in the present invention may be applied, inter alia, to all of the above noted receiving and transmitting devices and systems.

In FIG. 1 there is shown an exemplary system in which the present invention may be implemented. The illustration shows several user terminals 109, 111, and 113 which may be interconnected with several gymnasium or gym servers 101, 103 and 105 through an interconnection network 107 such as the Internet. The servers include gym scheduling and user database applications and the individual users' terminals also include communication programming to enable the users to communicate with servers over the interconnection network 107. As noted above, the user terminals can be a desktop personal computer (PC) or any information processing device, such as a cellular phone or personal digital assistant device (PDA), which may be connected as shown in FIG. 1 through a hard-wired or wireless system arrangement.

Figure 2:
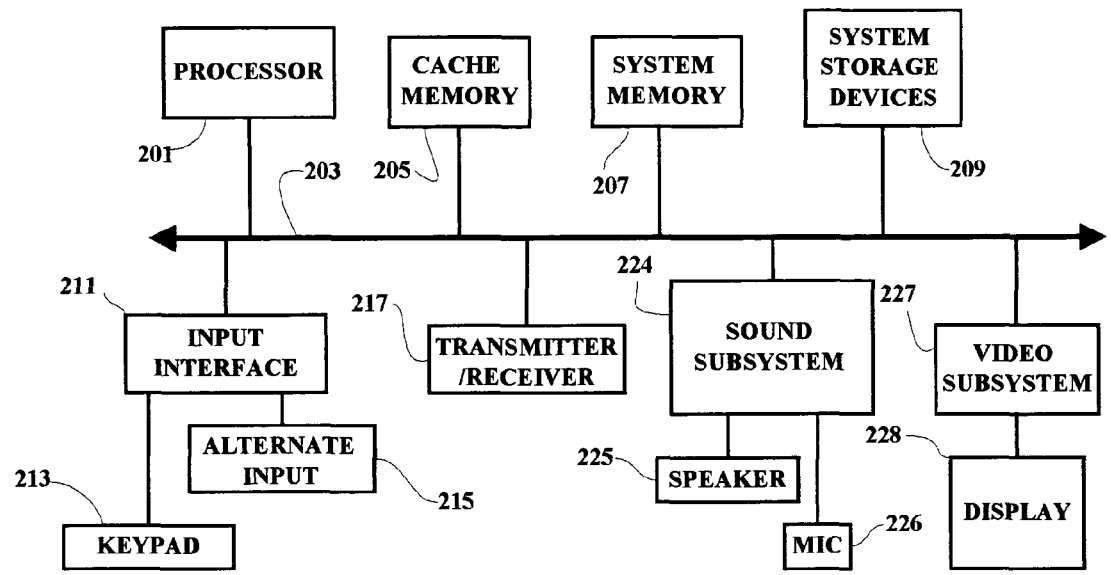
FIG. 2 is a schematic block diagram illustrating several of the major components of an exemplary computer system.

Several of the major components of an example of the device 101 are illustrated in FIG. 2. A processor circuit 201 is connected to a system bus 203. It is noted that the processing methodology disclosed herein will apply to many different bus and/or network configurations and is not limited to the configuration of the present example. A cache memory device 205 and a system memory unit 207 are also connected to the bus 203. The exemplary system also includes a system storage device 209. The system bus 203 is also connected through an input interface circuit 211 to a keypad or keyboard 213 as well as alternate input devices 215 which may include voice and/or stylus input devices, or touch-sensitive display screens which are capable of displaying menus for user selection of menu items as input. The bus 203 is also coupled to a transmitter/receiver section 217 which enables the receipt and transmission of digital information. The illustrated system may also be coupled to a network system through the transmitter/receiver section 217 and, as hereinafter explained, when implemented in a scaled down version within a workout station control unit, the receiver may also be used to receive signals effective to identify a user in the proximate area of the receiver. The exemplary system also includes a sound subsystem 224. Input means such as a microphone 226 and output means such as speaker 225 may also be included to enable a user to communicate with the device using voice commands and voiced menu and message playbacks. A video subsystem 227, which may include a graphics subsystem, is connected between the bus 203 and a display device 228. In general, the gym servers include the main components of the computer system shown in FIG. 2 but need not include all of the components illustrated. Similarly, the user terminals shown in FIG. 1 also include the main components of the computer system shown in FIG. 2 but need not include all of the components. Also, as hereinafter disclosed, control devices associated with each of the workout stations may generally include a processor, receiver or reader device, memory, input, display and output components. The receiver/reader device is used for detecting member ID numbers transmitted from a member card or entered as a bar code on the card by a member at the workout station. The station and equipment control devices may also be implemented using scaled-down control elements in which case much of the processing will be accomplished by the gym server and transmitted for display and/or equipment setting changes to the individual equipment control devices.

Figure 3:
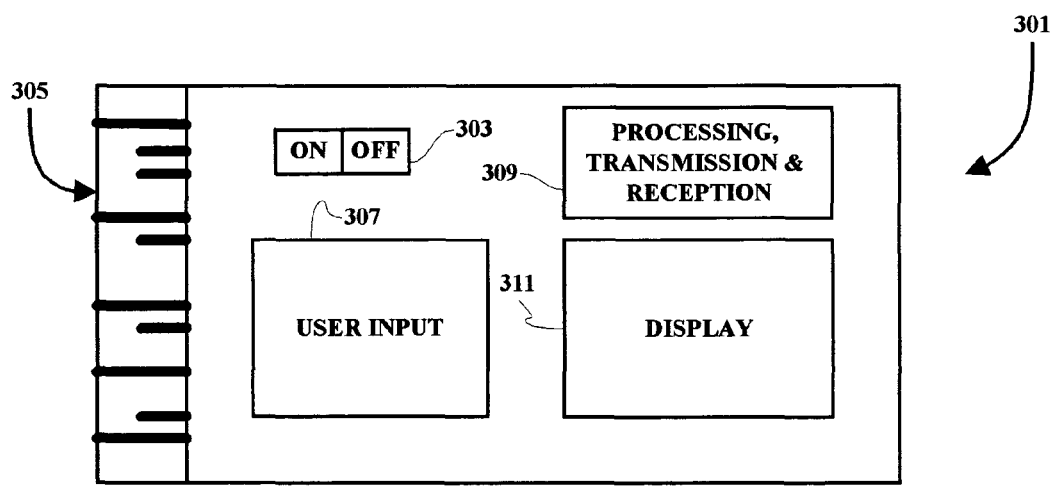
FIG. 3 is a schematic diagram illustrating various components within a user smart card which may be implemented in association with the present invention.

FIG. 3 illustrates an exemplary "smart card" 301 which may be used in connection with the present invention. Instead of using a smart card however, which would have to be purchased separately, software can be installed on existing pervasive/handheld devices such as a cell phone or PDA. With wireless networking capabilities, such devices can be enabled to transmit and receive signals which can be used for tracking and or processing including reservation processing, without additional cost.

As shown in the smart card example in FIG. 3, the smart card 301 includes an on-off switch 303, a code segment 305 such as a bar code or magnetic code, a user input area 307, a section for processing, transmitting and receiving signals 309 and a display area 311. The user input 307 may be embodied by a hardware keypad, or a virtual keypad could be presented on the display 311 for user interfacing. In one exemplary embodiment of an automated gym system, when the card 301 is turned "ON", the card begins to transmit a signal (ID signal) which is coded to identify the authorized individual using the card. That signal is continuously transmitted on a repetitive basis. In one application, the ID signal is received by a gym server and serves to establish that the individual using the card has entered the gym or is within a predetermined range of one of the workout stations. That information, in turn, is used to log-in the individual as present in the gym, or to perform a check on the reservation system to establish that the individual is present in accordance with a reservation schedule database maintained by the gym server. The transmitted ID signal may also be used in connection with a global positioning system in order to precisely locate the individual within the gym building premises for tracking the individual's workout progress. In another embodiment, the card 301 may be used by sliding the bar code through sensing and reading devices at the gym entrance and/or at each workout station in order to track the individual's presence and the individual's progress as compared with a workout schedule. The display 311 is used to alert and inform the individual relative to pertinent matters such as to display the individual's workout schedule for any given day. The card 305 may also be used to request a workout reservation from the gym server and input setting changes to equipment which is to be used during a workout session. The transmission of the user ID from a user's smart card may be accomplished, for example, in accordance with the methods disclosed in U.S. Pat. No. 5,960, 085 which is included herein by reference.

Figure 4:
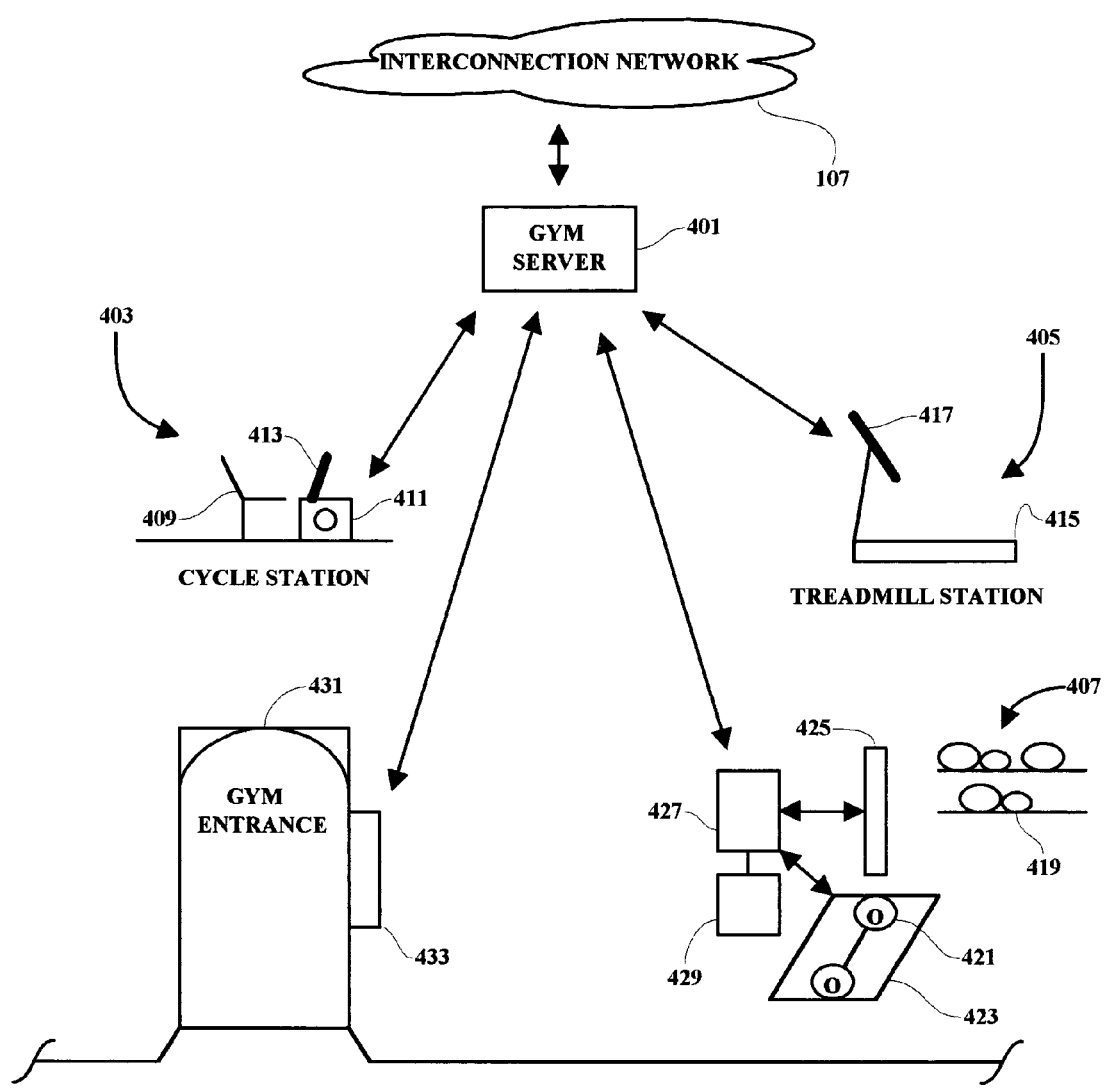
FIG. 4 is a schematic diagram illustrating several workout stations in a gymnasium in which the present invention may be implemented.

FIG. 4 illustrates an overall system including a gym server 401 which is connected through, for example, the Internet 107 to other servers and individual terminals as shown in FIG. 1. The gym includes, for example, one or more cycle workstations 403. Each workstation 403 includes a seat 409 and an exercise element 411 such as a pedaling device. The station 403, as well as all other workstations shown in FIG. 4, has a control unit which further includes a reader/receiver device, display device, processor, memory, input devices including a keypad and output means as discussed earlier. The reader/receiver is used to identify a user by receiving a transmitted ID signal from a smart card or reading a bar or magnetic coded user card. Such reading devices are commercially available and are not shown in the drawing in order to avoid unnecessary obfuscation. The cycle control unit 413 is arranged to communicate with the gym server 401 to transmit and receive workout data and schedule information associated with the cycle station 403 and the individual using the station.

The gym illustration shown in FIG. 4 also includes one or more treadmill stations such as treadmill station 405. Treadmill station 405 includes a moving belt 415 and measuring elements to gather and transmit workout data (such as speed, distance, time etc.) to a control unit 417. The control unit 417 includes a display device, processor, memory, input device, ID reader/receiver and output as discussed earlier. The treadmill control unit 417 is arranged to receive signals to identify a user and communicate with the gym server 401 to transmit and receive workout data and schedule information associated with the treadmill station 405 and the individual using the station. The gym illustration shown in FIG. 4 also includes one or more "weight" stations such as weight station 407. Weight station 407 includes a storage section 419 for storing weights that may be installed on a lifting bar for use in a weight lifting workout session. The weight station 407 includes a scale 423 and when a weighted lifting bar 421 is placed on the scale 423, the exercise weight of the lifting bar and attached weights is determined and recorded. The exercise weight is saved in a weight control unit 427 and may be displayed on an associated weight station display device 429. The weight control unit 427 also includes a user ID reader/receiver, an input device such as a keyboard. The display device 429 is arranged to display various kinds of information to a user, such as the value of the weight used, the schedule of the individual's weight program, the reps required and also the reps actually achieved. The number of weight lifting reps achieved may be determined by a rep measuring arrangement 425 as the user lifts the weight bar up and down along the axis of the measuring arrangement 425. The weight control unit 427 is arranged to communicate with the gym server 401 to transmit and receive workout data and schedule information associated with the weight station 407 and the individual using the station.

Figure 5:
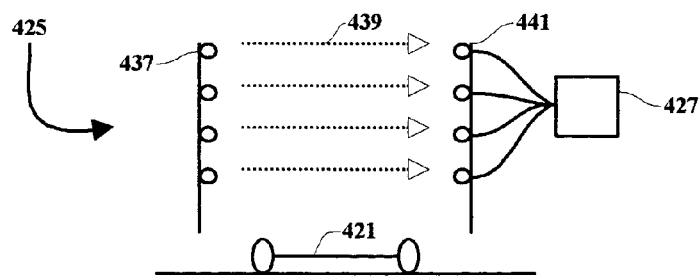
FIG. 5 is a schematic diagram illustrating an exemplary embodiment of a system which may be implemented to measure repetitions in an exercise routine.

FIG. 5 is an illustration of an example of the rep measuring device 425, and includes a linearly displaced series of light emitting sources 437 such as low power laser devices. The sources are arranged to transmit light along light paths 439 across a lifting area to receiving devices 441. The receiving devices 441 are arranged for connection to the control unit 427. With the arrangement shown in FIG. 5, the interruption of the light paths 439, as the weighted lifting bar 421 is raised and lowered through the paths 439, is tracked and used in determining the number of reps that a given weight set has been lifted and also the extent or dimension of the lifting. This provides useful information in establishing and measuring an effective weight lifting workout program for gym member users of the weight-related equipment.

In accordance with the present disclosure, an individual is enabled to reserve specific workstations within a gymnasium in a user-preferred sequence and at specific times by accessing a gym server through any appropriately programmed personal computing device. In one example, when a user wishes to make a workout reservation, the user will send a reservation request to the gym server. The format 601 shown in FIG. 6 may be used for this purpose. The format 601 will identify the user by member number and the date of the workout reservation request. This information is transmitted from the user to the gym server when the user points to 603 and clicks on a hypertext command such as "SUBMIT REQUEST" shown in FIG. 6. In response to that request, the gym server will hold a current schedule from other input to avoid conflicts, and transmit the current gym schedule for the requested day to the requesting user on the user's display device. An exemplary gym schedule is illustrated in FIG. 7.

As shown in FIG. 7, the gym schedule 700 shows incremental time slots throughout the day for each gym workstation. In the illustration, times for workstations that have previously been reserved by others are shown as "filled-in" or blackened-out 701 and other time slots for workout stations that are currently available are shown in phantom 703. As a user points to and clicks on an available time slot and Workout station with pointer 7057 the phantom outline of the time slot will change to a solid perimeter indicating a request for that time slot. Later when the request is confirmed, the time slot will change to a blackened rectangle such as slot 701. The user may also see that convenient time slots are not available and request another day's schedule. After the user has made reservation selections, the user will point and click 707 to enter the selections at the server.

In response to the receipt of the reservation request, the gym server will schedule the request, change the gym schedule to show that the selected slots are now taken and unavailable to others, and return a reservation confirmation notice to the user. An example of a reservation confirmation notice is shown in FIG. 8 and includes the date, the member number, and the times and specific workout stations reserved for the user. The notice may also include means to enable the user to change and/or view the settings 801 of the various exercise equipment units to be used during the scheduled workout session. These settings are maintained at the gym server in a member workout data and setting database which is maintained on each member of the gym. If the user wished to change or view any of the equipment settings, such as miles for the cycle station, weights for the weight station, etc., the user is enabled to point and click 803 on the change/view hypertext 801. If the user does not wish any changes or does not wish to view the current settings, the user may point to and click on an "EXIT" hypertext to terminate the program. If a member wishes to view and/or change the settings 801, the database is displayed to the user and the user is enabled to make changes and enter the changes in a convenient protocol (not shown).

FIG. 9 shows several information fields which may be maintained by the gym server regarding the reservation system data 900 including setting data. Reservation system information which may be recorded and saved includes such things as reservation ID used to identify specific reservations, as well as member ID, check-in time when a member checks into the gym, check-out time when a member leaves the gym, workout name to identify and distinguish one workout from others, exercise or machine names, alert time which is a time period, for example ten minutes, used to display a message on display devices associated with the various pieces of equipment stating that the equipment has been reserved by member number in ten minutes. This will provide notice to anyone using the equipment to vacate the equipment prior to the reserved time.

Similarly, FIG. 10 shows several exemplary data fields which may be maintained by the gym server regarding tracking system data 1000 for workout sessions. Such data items include a tracking ID number assigned by the server for tracking workout sessions, member number, workout number, settings and others as shown. All of the information shown is saved and recorded for each member workout session for use in developing a total comprehensive workout program.

Figure 11:
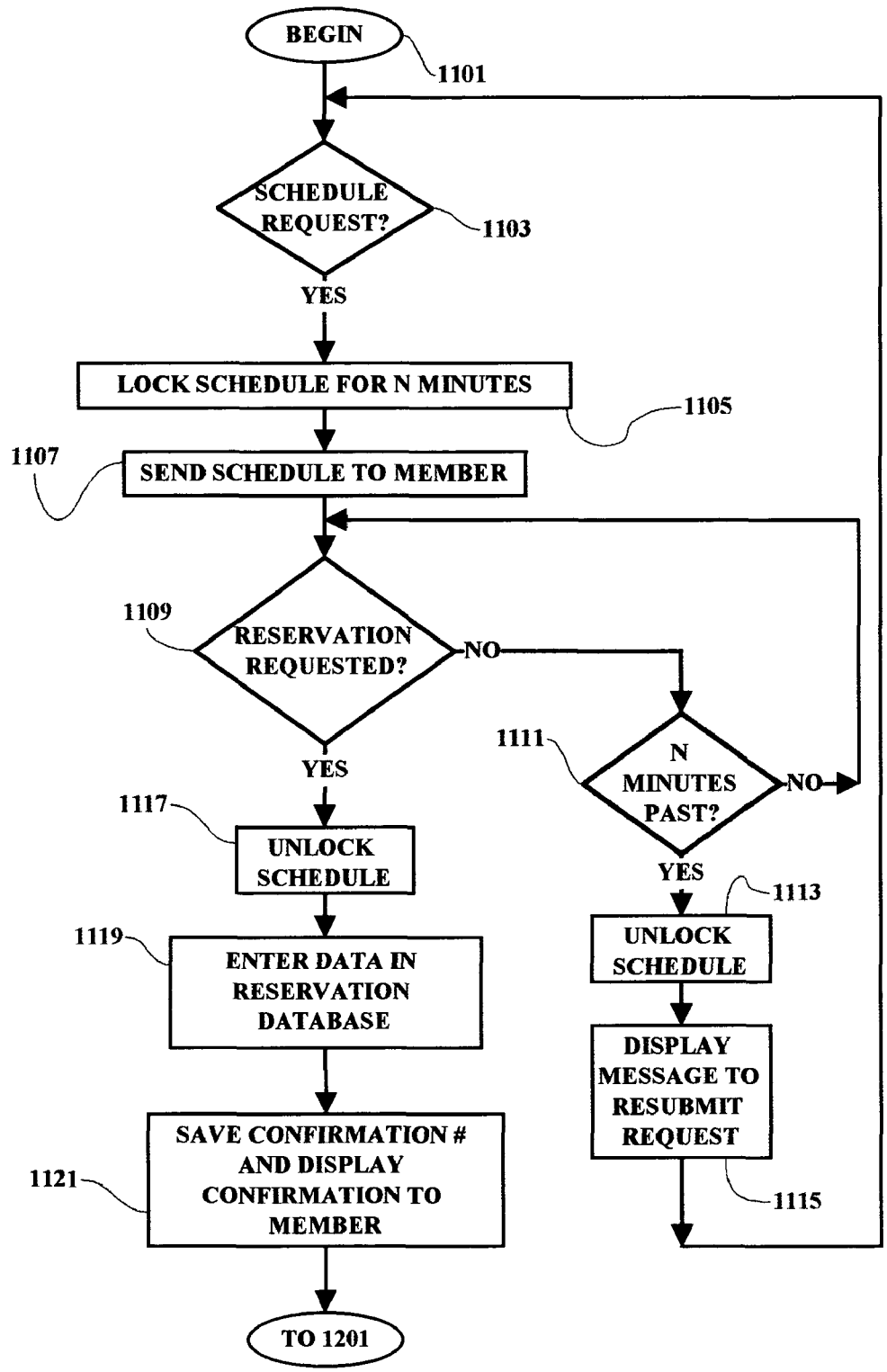
FIG. 11 is a flow chart illustrating an exemplary methodology for making gym reservations.

FIG. 11 shows an exemplary flow sequence in the disclosed reservation methodology for reserving selected equipment for selected times on selected dates. The process begins 1101 when a schedule request is received 1103. When a request is received 1103, the server temporarily locks further scheduling 1105 to prevent conflicts. Scheduling may be locked for only a predetermined "N" number of minutes in order to facilitate efficient reservation scheduling. The schedule is then transmitted to the requesting user 1107 to be displayed on the user's display device. If a reservation request is not received 1109 after "N" minutes have past 1111, then the schedule is unlocked 1113 for others to make reservations, and a message is displayed to the user to resubmit the request 1115. If a reservation request is received before the expiration of "N" minutes 1109, then the schedule is unlocked 1117 to enable the entering of the reservation request 1119. A confirmation number is then caused to be displayed to the user/member 1121 and the process continues to block 1201 (FIG. 12) for setting or viewing setting changes and equipment programming as appropriate.

Figure 12:
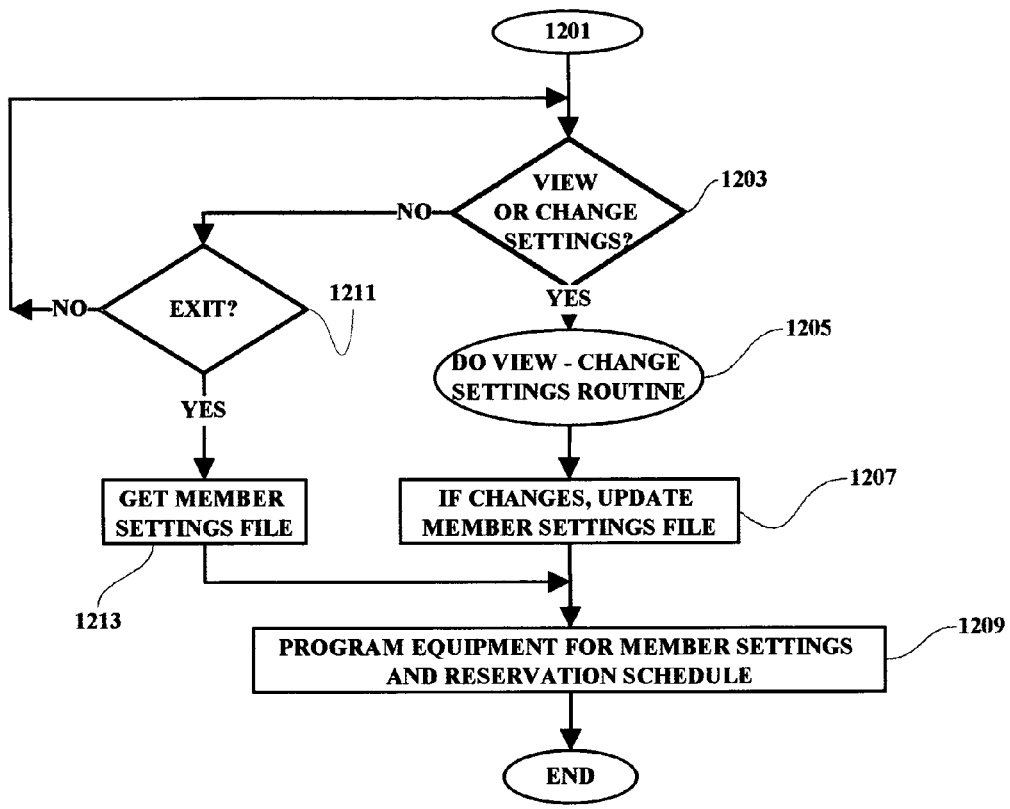
FIG. 12 is a flow chart illustrating an exemplary methodology for making equipment setting changes.

In the exemplary flow chart for the "CHANGE/VIEW SETTINGS" 801 function illustrated in FIG. 12, if the CHANGE SETTINGS hypertext 801 is not selected 1203, and instead the EXIT hypertext is selected 1211, the member settings file is retrieved 1213 and the equipment reserved by the member along with the appropriate settings for the equipment as gathered from the member settings file, is programmed for the times as reserved by the member 1209. The member settings on the reserved equipment may be set automatically by the server directly sending programming signals to the designated equipment at the reserved workout stations such that at the reserved time, or N minutes prior to the reserved time, the equipment settings are automatically set in accordance with the member's settings file. This can be accomplished following a display of an N minute warning message on the display device associated with the particular workout station. The warning message, stating that the workout station has been reserved, can be displayed or flashed on the station display device and operating feedback from the station can be monitored and checked to insure that there is no individual using the reserved equipment when the equipment settings for the next user are programmed into the reserved equipment. If the user selects to change or view the settings 1203 from the reservation screen 800, a view/change settings routine is called 1205 to display the settings and receive and enter the users changes if any are made. A portion of a displayed change settings screen (not shown) showing the user settings file would show only the settings and equipment used, and the date of the user's last workout session, and enable the user, under the user's actual ID or under an anonymous ID or alias, to enter any new settings to be applied for a reserved workout session. The file would be updated accordingly 1207 and the equipment may be programmed 1209 for automatic settings application to the equipment at the appropriate reserved time.

Figure 13:
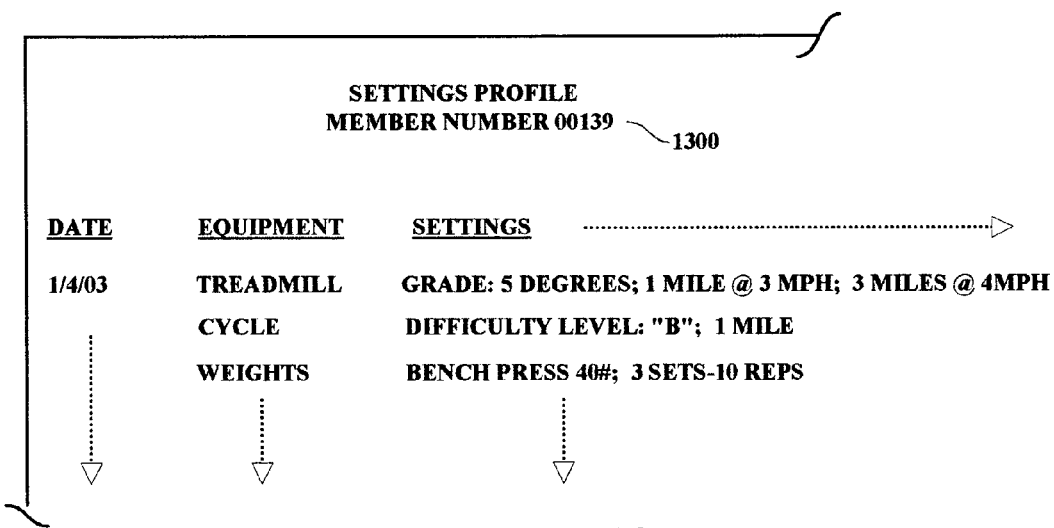
FIG. 13 is an illustration of equipment settings data that may be maintained in association with the present invention.

In FIG. 13, an example of a member or user settings file 1300 is illustrated. As shown, the file or database would contain all relevant information including but no limited to the equipment and settings on the corresponding equipment along with the dates of past workout sessions.

Figure 14:
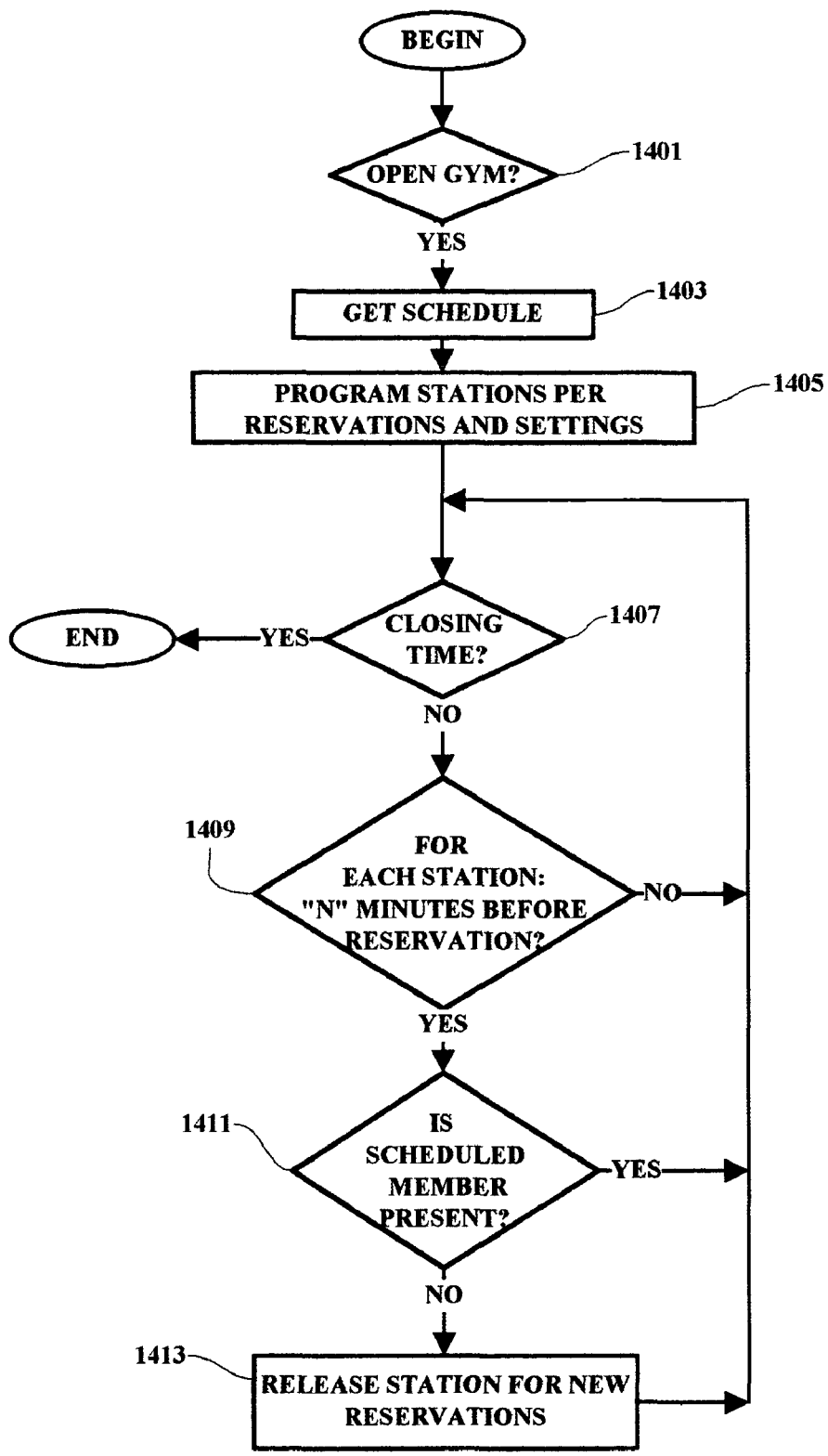
FIG. 14 is a flow chart illustrating one exemplary daily program for implementing scheduling and auto-cancellation features of the disclosed system.

In FIG. 14, an exemplary daily routine is illustrated in flow chart form. When the gym opens 1401 the schedule for the day is retrieved 1403 and the various stations are programmed 1405 to set the equipment for the appropriate settings at the appropriate times in accordance with the reservation schedule. For security and another level of verification, this can be managed by a gym administrator's visual inspection/approval process. Thereafter, a check 1409 is made N minutes before a scheduled workout session for each station to determine if the scheduled member for that station is present in the gym 1411. If the member is not present 1411, the station is released from the scheduled reservation and other members are then free to use or reserve the station. Whether or not a member is present is determined either by detection of the member's broadcast ID or by detection of the use of the card bar code on a reading device in the control unit of the appropriate workout station. Closing time is continuously checked 1407 and at closing time, the processing is ended for the day. Other functions can also be initiated at closing time such as the display and/or printout of members currently in the gym. This is useful to insure that everyone is out of the gym when it is closed.

Figure 15:
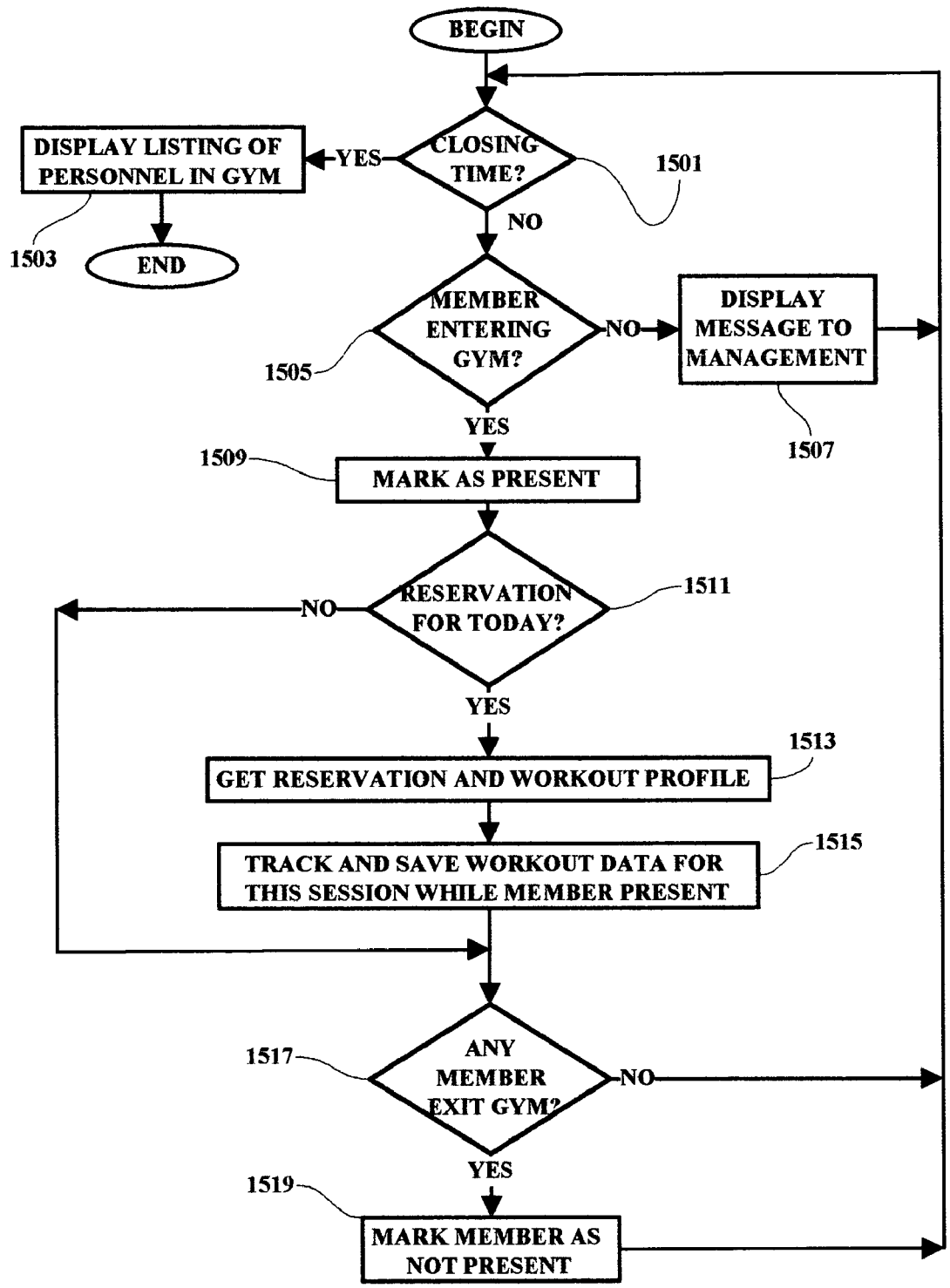
FIG. 15 is a flow chart illustrating one exemplary methodology for implementing a tracking and saving data from a workout session.

In FIG. 15, another exemplary routine is presented for tracking members who have entered the gym. As shown, all of the detected members are tracked after they enter the gym and at closing time 1501 a listing of personnel in the gym is displayed 1503. This listing may be automatically displayed at several locations throughout the gym and may also be printed out. As members enter the gym, they will be detected as "present" either by detection of the transmitted member ID from the member card by a sensor located at the entrance or by detection of the bar code as the member slides the member card through a reader at the gym entrance. Sensors at the gym entrance also detect the entrance of any person entering the gym whether or not they have a member card. When anyone enters the gym, a check is made to determine if the person is a member 1505. If the person is not a member 1505, an appropriate message is sent to a management unit to alert them that a non-member has entered the gym. If the member ID is compared to a member listing which is maintained at the gym server, and the entering person is a member 1505, then the member is marked as "present" 1509 in the gym on a "members present" listing maintained on the gym server. A check is then made to determine if the member has made a reservation for that day 1511, and if so, the reservation and settings or workout profile are retrieved 1513 and data from the reserved workout stations is tracked and saved 1515 as the member proceeds through the member's workout routine. If the entering member did not have a reservation for the day 1511, the workout profile or workout settings file is not retrieved for that member. When it is detected that an entered member leaves the gym 1517 that member is marked as not present 1519 as the routine cycles through a closing time check 1501 and the detection of members entering the gym.

Services can be programmed for members using a selected training program, the equipment used, frequency of visits, or any combination, and members would pay only for equipment or services used rather than a flat monthly fee. If no workout routine has been reserved but workout stations are available for use, a user can identify himself to the workout station by using the smart card or code card, then use the workout station and have workout data saved to a separate account or to his own account/profile workout database, with or without correlating the saved data to the user's regular workout routine tracking.

Figure 16:
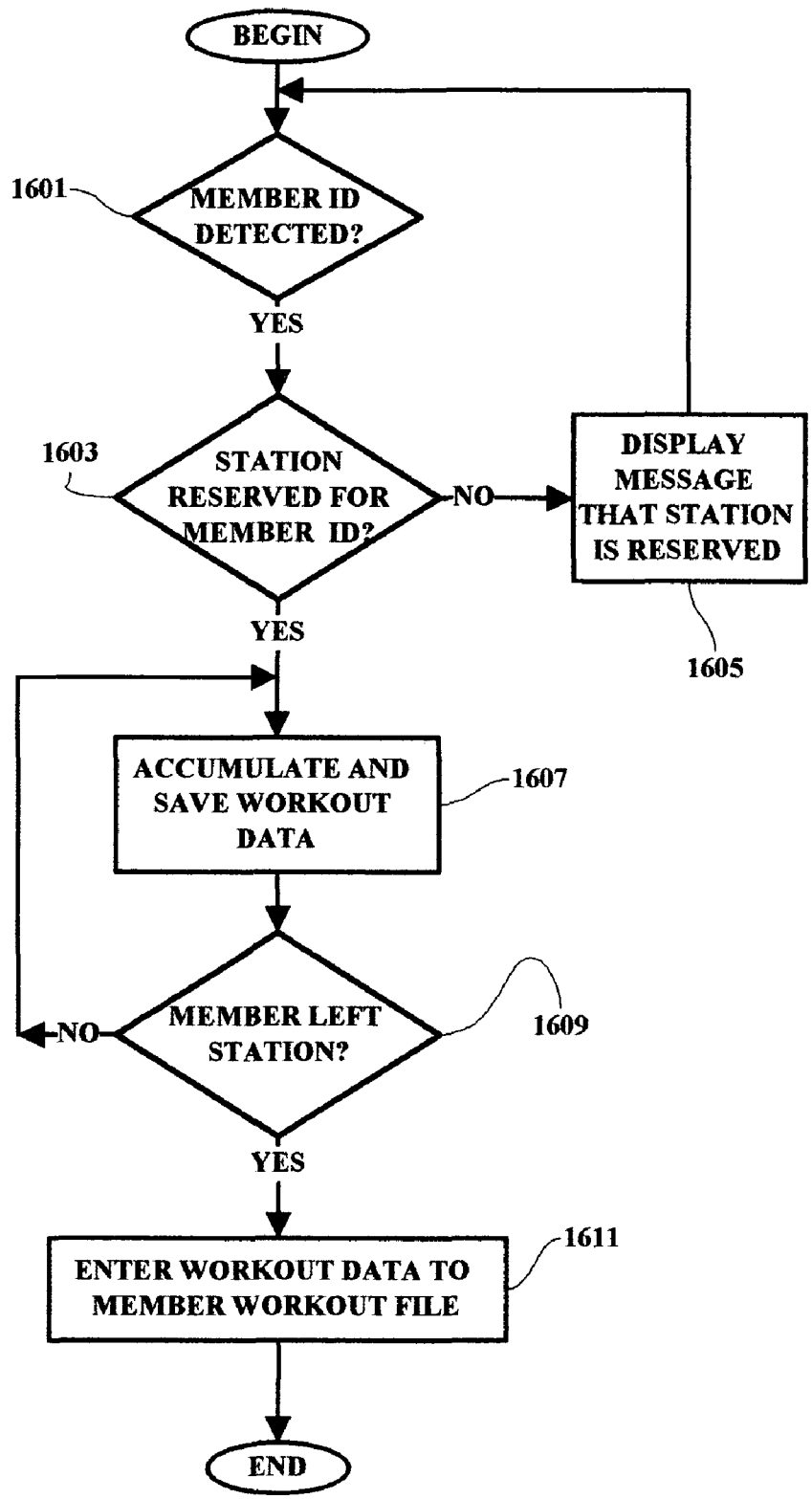
FIG. 16 is a flow chart illustrating another implementation for tracking and saving workout data.

In FIG. 16, an exemplary workout station flow sequence is illustrated. As shown, when a member ID is detected 1601 by a workout station detection device or reader in the control box (e.g. 413, 417, 427), a check is made to determine if that station has been reserved for the detected member ID 1603. If the detected member does not have a reservation for the workout station which has detected the member's presence, then an appropriate message is displayed 1605 at the display unit of the workout station. If the detected member has a reservation, then the workout data, e.g. distance, time, weights, reps etc., is accumulated and saved 1607. In addition, the workout stations may be disabled when reserved for an individual user and only enabled for operation when the ID signals of the reserving individual user have been detected at the workout station. When the member is detected as leaving the workout station 1609, the accumulated workout data are entered to the member's workout profile and/or settings file. A member is detected as leaving a workout station when the member passes his ID coded card through a station reading device when the member is finished using the workout station. If a transmitting or "smart" card is used, a member is determined to be leaving the workout station when the member is far enough from the workout station that the ID signal transmission is no longer picked-up by the ID signal receiver at the particular workout station. This processing occurs at each workout station as each member is detected as being in a predetermined proximity to the workout station.

Workout data (system, equipment, time, reps, sets, etc.) can be converted into a standard format such as XML, at the workout station control units before being inserted into the tracking system at the server. With that arrangement, members can download information from any computer with network connectivity using a browser, and feed the data into the tracking software of their choice.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in a portable or fixed memory device, such as so-called "Flash" memory, from which it may be loaded into other memory devices and executed to achieve the beneficial results as described herein.

Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for operating a workout facility having a plurality of workout stations arranged for use by a user, said method comprising:

a processor detecting when said user enters said workout facility by detecting a user identification (ID) signal transmitted from a device carried by said user;

a processor determining when said user is in proximity to a first workout station;

a processor measuring workout data generated by said user at said first workout station;

a processor determining when said user has finished using said first workout station; and a processor saving said workout data to a workout data file associated with said user when said user has finished using said first workout station.

2. The method as set forth in claim 1 wherein said workout data file is maintained at a server within said workout facility.

3. The method as set forth in claim 1 wherein said determining when said user is in proximity to a first workout station is accomplished by receiving a user ID signal transmitted from said device carried by said user.

4. The method as set forth in claim 1 wherein said determining when said user is in proximity to a first workout station is accomplished by reading a bar code readable by an optical reading device.

5. The method as set forth in claim 1 wherein said determining when said user is in proximity to a first workout station is accomplished by reading a magnetic code on a medium readable by a magnetic code reading device.

6. The method as set forth in claim 3 wherein said determining when said user has finished using said first workout station is accomplished by detecting an absence at said first workout station of a user ID signal from said device carried by said user.

7. The method as set forth in claim 1 and further including a processor displaying said workout data on a display device located at said first workout station.

8. The method as set forth in claim 1 and further including:
a processor displaying said workout data file of said user on a display device located at said first workout station.

9. The method as set forth in claim 8 wherein said workout data file further includes a workout routine for said user, said workout routine including specific workout protocols for said user at each of said plurality of workout stations.

10. The method as set forth in claim 9 and further including a processor displaying said specific workout protocols for said user on display devices at workout stations being used by said user.

11. The method as set forth in claim 1 and further including a processor saving workout data from one or more of said workout stations to said workout data file.

12. The method as set forth in claim 1 and further including a processor enabling reservation of selected workout stations by said user.

13. The method as set forth in claim 12 and further including a processor displaying notice of said reservation of a reserved workout station at a display device located at said reserved workout station.

14. The method as set forth in claim 13 and further including a processor disabling said reserved workout station, said reserved workout station being selectively enabled by said receiving of an ID signal associated with said user at said reserved workout station.

15. A computer-readable storage device having program instructions stored therein, said program instructions being executable by at least one processor to implement a method for operating a workout facility having a plurality of workout stations arranged for use by a user, said method comprising:

a processor detecting when said user enters said workout facility by detecting a user identification (ID) signal transmitted from a device carried by said user;

a processor determining when said user is in proximity to a first workout station;

a processor measuring workout data generated by said user at said first workout station;

a processor determining when said user has finished using said first workout station; and a processor saving said workout data to a workout data file associated with said user when said user has finished using said first workout station.

16. A method for operating a workout facility having a plurality of workout stations arranged for use by individual users, said method comprising:

a processor receiving a request from a user to schedule a workout session using one or more of said workout stations at said workout facility;

a processor enabling user access to a facility workout schedule for one or more of said workout stations within said workout facility;

a processor receiving scheduling input from said user, said scheduling input defining a user workout schedule for said user at said workout facility;

a processor storing said user workout schedule at a server used by said workout facility;

a processor reserving workout stations scheduled by said user to enable only said user to use said reserved workout stations at times designated in said user workout schedule;

a processor detecting when said user enters said workout facility by detecting a user identification (ID) signal transmitted from a device carried by said user;

a processor storing information indicating a presence of said user at said workout facility in response to said detecting;

a processor determining when said user is in proximity to a first workout station scheduled for use by said user;

a processor displaying said user workout schedule on a display device viewable by said user from said first workout station in response to said determining;

a processor collecting workout data of said user while said user is working at said first workout station;

a processor determining when said user departs from said first workout station;

a processor updating said user workout schedule by recording said workout data of said user collected at said first workout station after said user has departed from said first workout station;

a processor terminating said displaying after said determining that said user has departed from said first workout station; and a processor enabling other users to use said first workout station after said user has departed from said first workout station.

17. The method as set forth in claim 16 wherein said scheduling input is received from a user wireless device, said user wireless device being located remotely from said workout server.

* * * * *